June 10, 1924.

M. SMITHEY

INDICATOR FOR MOTOR VEHICLES

Filed Sept. 18, 1916

WITNESSES

INVENTOR
MARVIN SMITHEY.
BY
ATTORNEYS

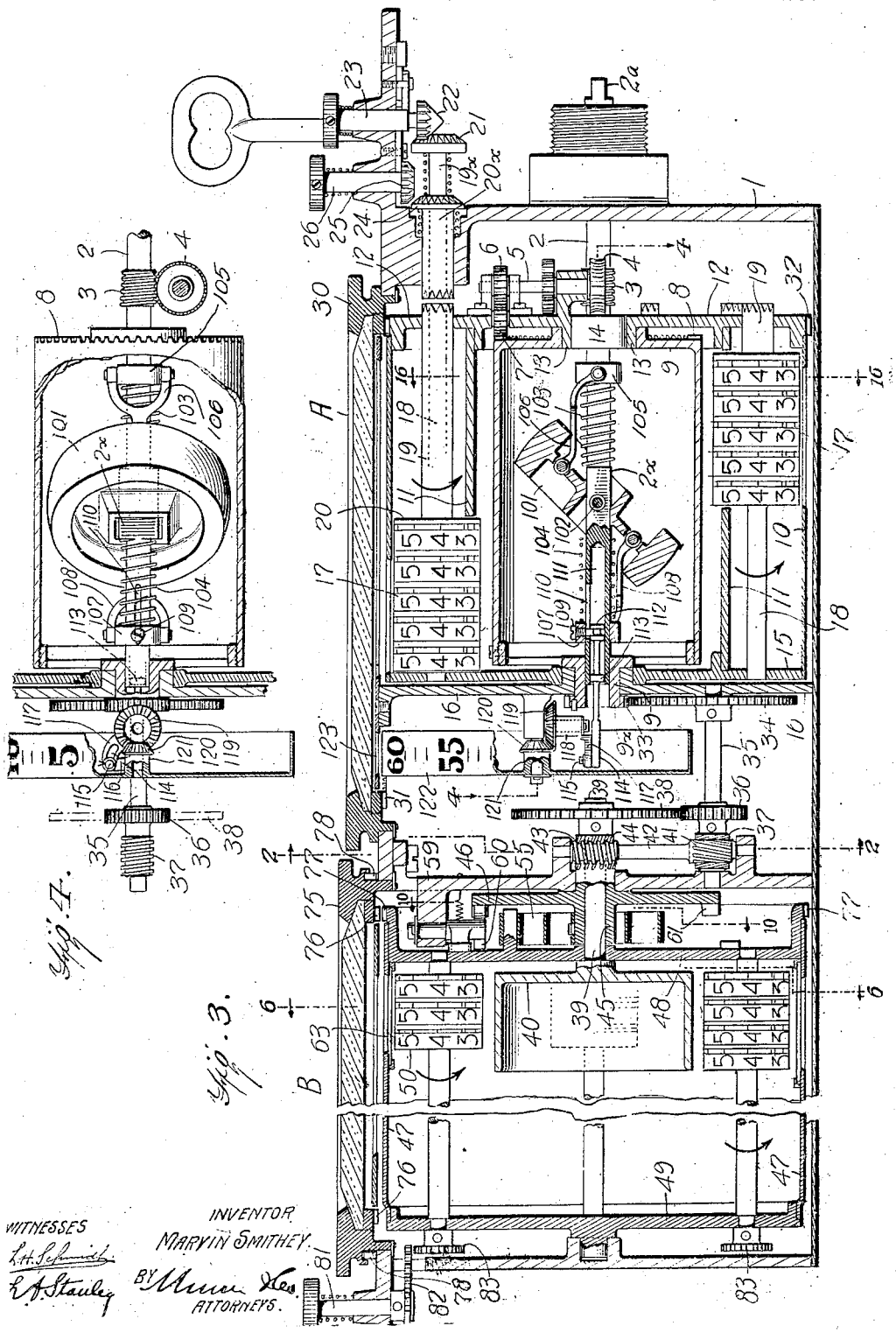

June 10, 1924.
M. SMITHEY
1,497,387
INDICATOR FOR MOTOR VEHICLES
Filed Sept. 18, 1916    5 Sheets—Sheet 3
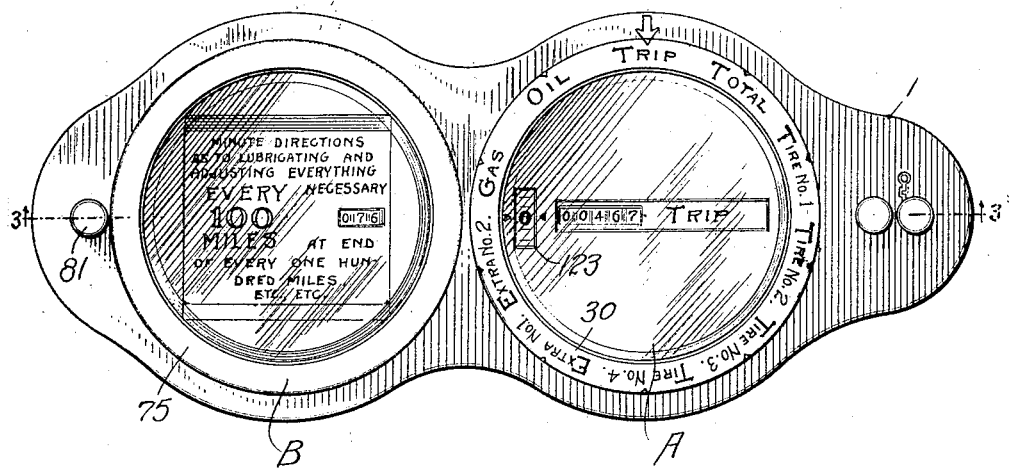
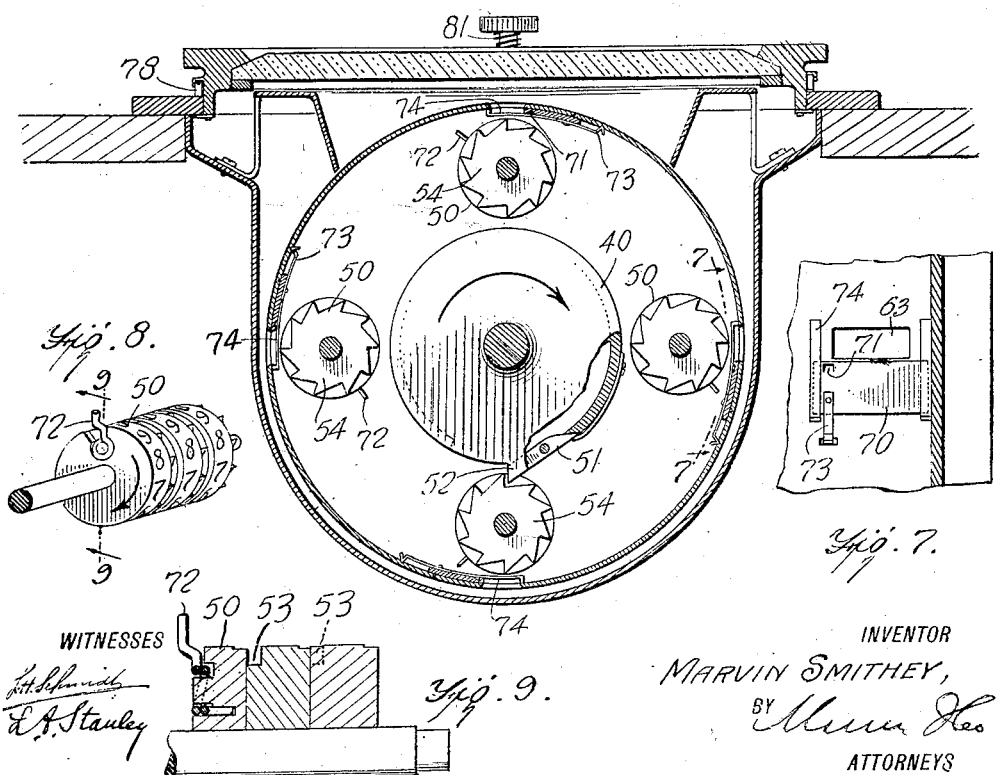
INVENTOR
MARVIN SMITHEY,
BY
ATTORNEYS
WITNESSES June 10, 1924.

M. SMITHEY

INDICATOR FOR MOTOR VEHICLES

Filed Sept. 18, 1916   5 Sheets-Sheet 4

WITNESSES

INVENTOR
MARVIN SMITHEY,
BY
ATTORNEYS

June 10, 1924.
M. SMITHEY
INDICATOR FOR MOTOR VEHICLES
Filed Sept. 18, 1916
1,497,387
5 Sheets-Sheet 5
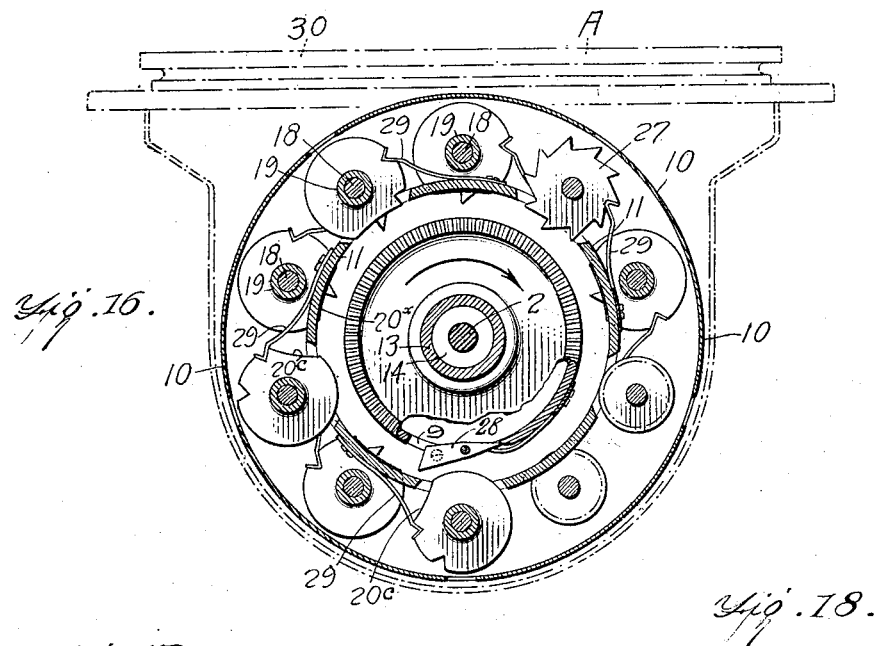
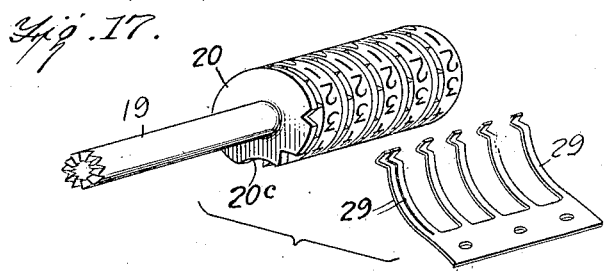
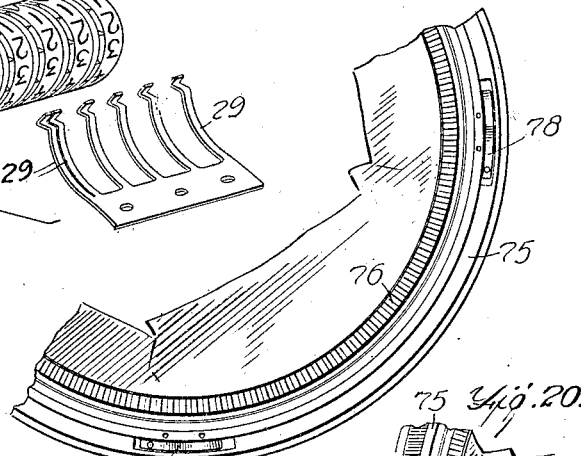
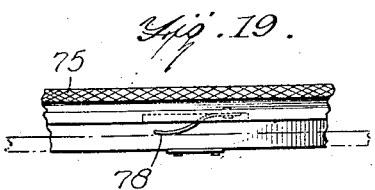
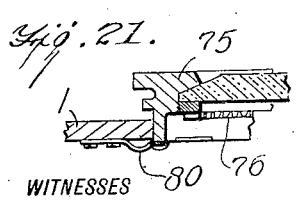
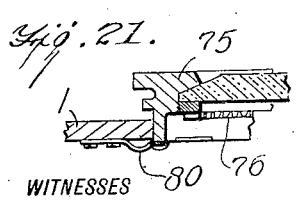
INVENTOR
MARVIN SMITHEY,
BY
ATTORNEYS
WITNESSES Patented June 10, 1924.

1,497,387

UNITED STATES PATENT OFFICE.

MARVIN SMITHEY, OF LAWRENCEVILLE, VIRGINIA.

INDICATOR FOR MOTOR VEHICLES.

Application filed September 18, 1916. Serial No. 120,826.

*To all whom it may concern:*

Be it known that I, MARVIN SMITHEY, a citizen of the United States, and a resident of Lawrenceville, in the county of Brunswick and State of Virginia, have invented a certain new and useful Improvement in Indicators for Motor Vehicles, of which the following is a specification.

My invention relates to improvements in meters, and it consists in the combinations, constructions, and arrangements herein described and claimed.

An object of my invention is to provide a speedometer which is used in combination with a series of odometers, these odometers being related to particular parts of the vehicle, such as a particular tire, so that the mileage of any tire may be readily obtained, or the mileage of any other part with which an odometer is associated may be observed.

A further object of my invention is to provide a device of the type described having novel means for bringing certain of the odometers into reading position successively and intermittently, said means comprising an escapement device.

Other objects and advantages will appear in the following specification, and the novel features of the invention will be particularly pointed out in the appended claims.

My invention is illustrated in the accompanying drawings forming part of this application, in which:

Figure 3 is a section along the line 3—3 of Figure 5;

Figure 4 is a section along the line 4—4 of Figure 3;

Figure 5 is a plan view of the device;

Figure 6 is a section along the line 6—6 of Figure 3;

Figure 7 is a section along the line 7—7 of Figure 6;

Figure 8 is a perspective view of one of the odometer units;

Figure 9 is a section along the line 9—9 of Figure 8;

Figure 16 is a section along the line 16—16 of Figure 3;

Figure 17 is a perspective view of one of the odometer units and a series of spring locking members associated therewith;

Figure 18 is a bottom plan view of a portion of the mechanism;

Figure 19 is a detail view of a portion of the device shown in Figure 18;

Figure 20 is a bottom view of a modified form of the device, and

Figure 21 is a section along the line 21—21 of Figure 20.

Figure 1:
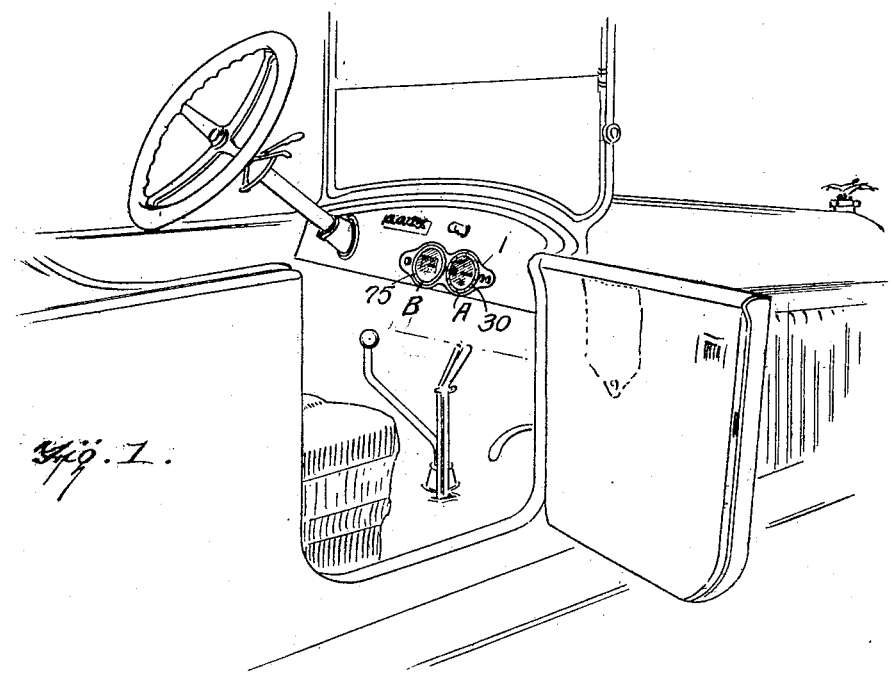
Figure 1 is a perspective view of the device as applied to an automobile.
Figure 2:
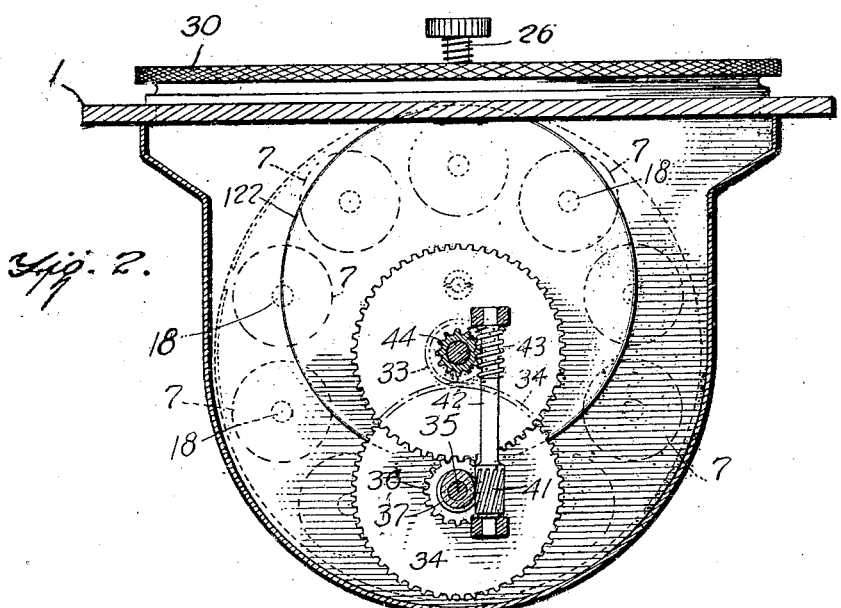
Figure 2 is a section along the line 2—2 of Figure 3.

In carrying out my invention I provide a main casing 1 in which is housed two meter mechanisms shown in general at A and B respectively, the former including a speedometer and odometers relating to particular parts of the vehicle, such as different tires, and the latter containing a movable drum bearing minute instructions for proper lubrication and adjustment of various parts when the odometers, which are associated with the drum, register given mileages.

The two meter mechanisms are connected together, and are driven by common power means.

Referring now particularly to Figure 3, it will be seen that a drive shaft 2 extends through the casing 1 and terminates in an end 2ª which may be connected with a flexible transmission, such as that ordinarily extending from the wheel to the common odometer. The shaft 2 bears a worm 3 which engages with a worm wheel 4 on a shaft 5. The latter bears a gear 6 which engages a gear 7, the gear 7 in turn being in mesh with teeth 8 on a drum 9 which is mounted to rotate about the axis of the shaft 2.

Disposed exteriorly of the drum 9 is a drum having an outer wall 10 and an inner wall 11. One end 12 of this drum is provided with a hub 13 which bears on an enlarged portion 14 of the shaft 2, the hub 13 forming in its turn a bearing for one end of the drum 9. The opposite end 15 of the drum 9 bears on the cylindrical extension of a partition 16, this extension being bored to receive a sleeve 9× carried by the drum 9 which is mounted for revolution on the shaft 2.

The drum 10 has a series of odometers 17 each odometer having a shaft 18, see Figures 3 and 16, which is surrounded by a sleeve 19 bearing a notched wheel 20. Both the shaft 18 and the sleeve 19 have clutch members at their outer ends which engage similar clutch members on a slidable shaft 19× and a slidable sleeve 20× respectively. The former has a gear 21 arranged to be engaged by a gear 22 on a spring pressed plunger 23, while the sleeve 20× has a gear 24 arranged to be engaged by a gear 25 on a spring pressed plunger 26. The arrangement is such that, when the plunger 23 is forced downwardly, the gear 22 is brought into engagement with the gear 21 forcing the shaft 19× into engagement with the shaft 18, so that when the plunger 23 is rotated, the shaft 18 will be rotated to set the odometers. Similarly when the plunger 26 is pressed downwardly, the gear 25 will be brought into engagement with the gear 24, forcing the sleeve to the left in Figure 3, and causing its engagement with the sleeve 19, whereby the wheel 20 may be turned. The springs return the mechanism to the position shown in Figure 3, when pressure is relieved.

The odometers 17 are driven by means of spring-pressed pawls which are carried by the drum 9. As will be observed from Figure 16, each number wheel is provided with a ratchet 27 which projects through an opening in the inner wall 11 of the drum 10 in the path of a spring pressed pawl, such as that shown at 28. The rotation of the drum 9 will cause the pawl 28 to operate the odometers in succession. Spring pressed locking members 29 are provided for preventing a rearward movement of the number wheels. Each of the wheels 20 has a cut away portion 20°, and normally these cut away portions are turned in such position, see Figure 16, as to permit the pawls 28 to engage the ratchets 27, but the wheel may be so turned as to bring a portion in position to prevent the pawl 28 from engaging the corresponding ratchet wheel, and in such case the odometer is put out of commission. The drum 10 may be turned to bring any odometer into reading position by turning a ring 30, which is provided with teeth 31, arranged to engage the teeth 32 on the periphery of the drum at the end 12.

The sleeve 9× is provided with a gear 33 arranged to engage a gear 34 on a shaft 35. This shaft 35 is provided with two driving members, one a gear 36 and the other a worm 37. The gear 36 engages a gear 38 on the end of a shaft 39. The opposite end of the shaft 39 bears a drum 40. The worm 37 engages a worm wheel 41 on a shaft 42, the latter bearing a worm 43 which engages a worm wheel 44 on a sleeve 45 which surrounds the shaft 39 and which is in fact the hub of a wheel 46.

An outer drum 47 is provided with ends 48 and 49 respectively. This drum 47 is revoluble on the shaft 39. It bears a series of odometers 50, see Figures 3 and 6, which are operated by spring pressed pawls, such as that shown at 51 in Figure 6. The units number wheel of each odometer may be operated by a fixed lug 52, but the remaining pawls only operate their respective number wheels when openings 53, such as those shown in Figure 9, come opposite the said pawls and permit their entrance into engagement with the ratchets, like those shown at 54 in Figure 6. This arrangement of the pawls, 51, is similar to that of my Patent No. 1,195,161 issued August 15, 1916, in that the pawls, 51, have a width in each case so that the pawl overlaps adjacent portions of the adjoining odometer wheels and the notches which provide the ratchet teeth in one wheel are below the periphery of the wheel so that to enable the pawl to engage a ratchet tooth, the depression, 53, in the adjoining odometer wheel must be provided to allow the pawl to drop far enough to engage the ratchet teeth on the adjacent odometer wheel at the time the carrying motion from a wheel of lower denomination to a wheel of higher denomination is to take place. In this portion of the meter mechanism there is no necessity for resetting the odometers, as distinguished from that portion of the mechanism already described. However, I provide a resetting mechanism as hereinafter described because there are certain advantages which come in resetting them in connection with a signal device that cooperates with the odometer on a mileage basis.

Figure 10:
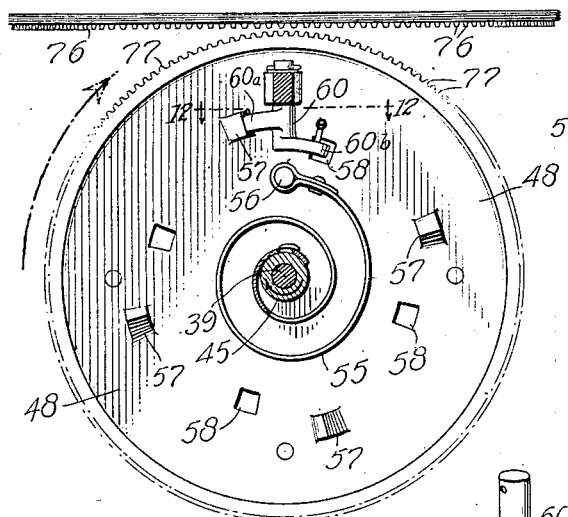
Figure 10 is a section along the line 10—10 of Figure 3, looking in the direction of the arrows.
Figure 11:
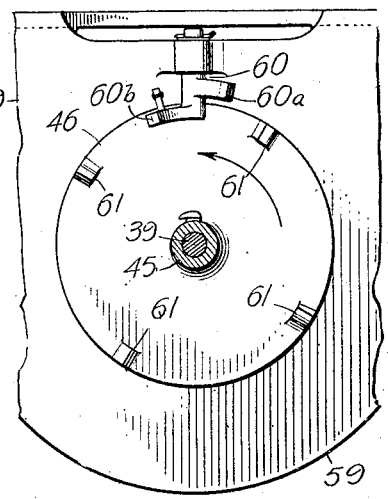
Figure 11 is a section along the same line, looking in the opposite direction.
Figure 15:
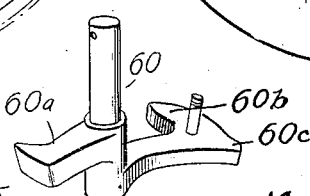
Figure 15 is a perspectve view of a portion of the escapement mechanism.

As will be seen from Figure 3, the hub 45 of the wheel 46 bears a spiral spring 55, see also Figure 10. The opposite end of this spring 55 is secured to a post 56 carried by the end 48 of the drum 47. The end 48 also bears a lug 57 for each of the odometers, there being in the present instance four lugs. The end 48 is provided with four openings 58, as shown in Figure 10.

Figure 12:
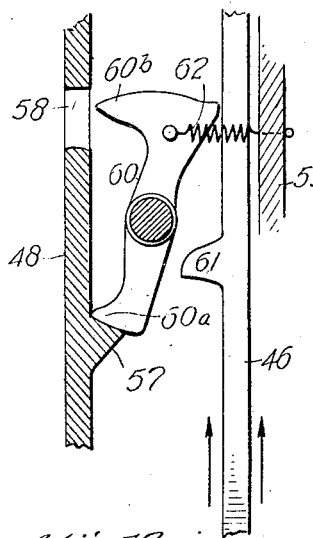
Figure 12 is a section along the line 12—12 of Figure 10, showing the parts in one position.
Figure 13:
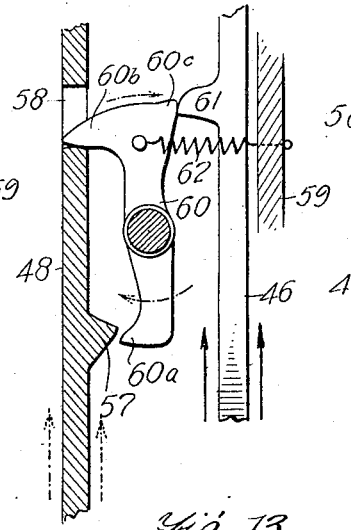
Figure 13 is a similar section showing the parts in another position.
Figure 14:
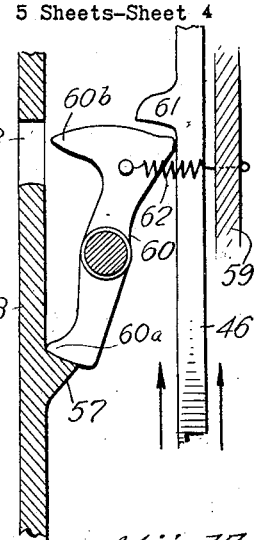
Figure 14 is a similar section showing the parts in a third position.

Rotatably mounted on the partition 59 is an escapement member 60, like that shown in Figures 12 to 14 inclusive. This escapement mechanism is designed to cooperate with lugs 61 on the disk or wheel 46, as well as the lugs 57 on the end 48 of the drum. The operation of the drum 47 is as follows: Through the medium of the shaft 35, the gears 36 and 38, the shaft 39 is turned, and this turns the drum 40 which operates the odometers in the manner already described. Through the medium of the worm 37, the worm wheel 41, the worm 43, and the worm gear 44, the wheel 46 is turned, and in turning tightens up on the spring 55. The drum end 48 is kept from turning by the engagement of one end of the escapement mechanism 60, i. e., the end 60ª with a lug 57 as shown in Figure 12. Further rotation of the wheel 46 will bring a lug 61 in position to free the end 60ª of the escapement mechanism 60 from the lug 57 and to bring the end 60ᵇ into engagement with the member 48 in the opening 58. During this movement, the drum will move slightly, but after the lug 61, see Figure 13, has passed the heel 60ᶜ of the escapement mechanism, then the spring 62 will bring the escapement member 60 into the position shown in Figure 14. The drum end 48 will, however, be free of the escapement mechanism 60 for a portion of the time, so that the spring 55 will turn the drum a quarter of a revolution, or until the succeeding lug 57 engages the end 60ª of the escapement mechanism 60. This will bring the next odometer in succession to the reading opening 63, see Figure 3. It will thus be seen that the drum 47 which contain these odometers, is rotated intermittently.

Now, due to the fact of the speed reducing mechanism, the drum 40 rotates much faster than the wheel 46, so that the drum 47 is turned a quarter of a revolution in, say, every twenty miles or so.

It will be obvious that the interval of rest of the drum 48 between its intermittent movements is considerably greater than the time for rotating the drum from one odometer position to the next, under the influence of the spring. The effect is to suddenly bring one odometer into view and hold it there for a sufficient length of time to enable the operator of the vehicle to view the odometer at his leisure; subsequently the next odometer is brought into view, and may be viewed at leisure, thus obviating the difficulty which may be experienced if the drum bearing the odometers were to be continuously rotated and not intermittently rotated, since then the operator would have to view a moving odometer and not a stationary one.

I have provided means for calling attention to the fact that a certain adjustment is necessary, or certain lubrication must be done, by having a shutter which will cover the numerals of any of the odometers after a certain mileage has been traversed. To this end, each of the odometers is provided with a slidable shutter 70 which has a recess 71 arranged to be engaged by a pin 72 which is disposed on the number wheels of the odometers in such position as to operate this shutter after the odometer has registered a given mileage. This shutter will then be drawn forward by the engagement of the pin with the recess 71, so as to close the view of the odometer numerals. The shutter is designed to call attention to the fact that the lubricating or adjustment must be done, and to this end it is made in a distinctive color, such as red.

In Figure 6 it will be seen that when a pin 72 engages a shutter 70 in the recess 71, the shutter which is normally held by a spring 73, see Figure 7, will be drawn forward to the end of a guide strip 74. Further rotation of the odometer will free the pin 72 from the shutter and leave the latter in its position of warning.

The drum 47 may be revolved manually, so as to bring any odometer into reading position. In order to effect this manual operation I provide a ring 75 having teeth 76 arranged to engage teeth 77 carried by the end 48 of the drum. Normally, however, the ring 75 and its teeth 76 are held away from the teeth 77 by means of springs 78, see Figures 3, 6, 18, and 19. Normally the ring 75 is in the position shown in Figure 3, but it may be brought into operative relation with the drum 47 by pressing downwardly on the ring and rotating it, when the teeth 76 and 77 will mesh to cause the rotation of the drum 47.

In Figures 20 and 21 I have shown a modified means of mounting the ring 75, which consists of a spring 80 secured to the under side of the casing 1 in such a manner that, when the ring is pushed downwardly, the spring will give to permit the engagement of the teeth 76 with those on the drum 47. Obviously there will be a number of these springs at various parts around the circumference of the ring.

The means for resetting the odometers of the meter mechanism B consist of a spring pressed plunger 81 having a gear 82 adapted to engage any of the gears 83 on the shafts of the odometers when the latter are in reading position. To reset the odometer it is only necessary to push the plunger 81 downwardly and then to rotate it, thereby rotating the odometer shaft in either direction.

It will be seen that by providing for the resetting of the odometers, movement of the odometer shutter into display or signal position can be accurately timed to the mileage at which it is to be displayed. Hence, if the user of the car should disregard the signal at the time of its display and fail to perform the act to which it calls attention, and to reset the shutter and should then continue to run the car, say, for fifty miles, then on performing it and resetting the shutter, he could reset the odometer to zero, for example, and thus assure that the signal would subsequently be displayed when the car had run the number of miles at which the signal should be displayed. Instead of resetting the odometer to zero, it could be reset, say, to twenty-five miles or other number, should it be desired to have the signal displayed at a shorter or less mileage than when starting at zero. The restoring or resetting, of the shutter is, of course, effected by the engagement of the pin, 72, with the shutter, said pin engaging the forward edge thereof, and, after moving the shutter backward passing out of contact therewith.

The pin, 72, which slides the shutter, is, as clearly shown in Figs. 8 and 9, spring supported, so that in moving in the direction to display the shutter, it first contacts with the underside thereof, and yields backward as it slides over the shutter until it reaches the notch, 71, into which it then springs and remains therein until the shutter is moved to display position and stopped by the contact of its forward edge with stop lugs at the ends of the guides, 74, the pin then moving onward alone. On the reverse movement of the pin, when the odometer is reset, the pin strikes the forward edge of the shutter and carries the latter backward, the pin finally, by reason of the diverging paths of travel of shutter and pin, passing out of engagement with the shutter in its non-display or inoperative position.

It will be seen that the actuating and transfer pawls, 51 and 52, are only momentarily in engagement with the ratchet wheels of the odometers, 50, such engagement being sufficient for the purpose of moving the wheels one-tenth of a revolution. When they are out of engagement with the ratchet wheels, the odometer wheels are free to be turned backward as well as forward without any hindrance from such pawls.

In connection with the mechanism A, I make use of a speedometer of novel form. This is best shown in Figures 3 and 4.

Pivotally mounted on the shaft 2 is a wheel 101, the pivot pin 102 passing through the shaft 2 as shown in Figure 3. The portion of the shaft 2 upon which the wheel is mounted is enlarged as shown at 2×, and on each side of this portion and surrounding the shaft 2, are springs 103 and 104 respectively. The spring 103 bears against a slidable collar 105 which has a link 106 which pivotally connects the collar with one of the spokes of the wheel. The spring 104 in turn engages a collar 107 which is provided with a link 108 secured to a spoke of the wheel 101 on the opposite side of the shaft. Normally the springs 103 and 104 tend to keep the collars 105 and 107 far apart. As the shaft 2 is rotated, the centrifugal force exerted by the wheel tends to pull the collars toward the pivotal point of the wheel against the tension of the springs 103 and 104.

Carried by the collar 107 is an adjustable screw 109 whose inner end extends through a slot 110 in the hollow portion 111 of the shaft 2.

Slidably disposed in the hollow portion 111 is a plunger having a grooved head 112 and a guide member 113. The end of the screw 109 is disposed in the groove in the head 112 so that the shaft 2 may be rotated without rotating the plunger 112. Any longitudinal movement of the screw 109 along the shaft 2 will, however, cause a movement of the plunger 112. Extending from the guide member 113 is an arm 114 which is bent laterally as shown in Figure 4, the end of this arm bearing a pin 115 arranged to extend through a cam slot 116 in an extension 117 of a sleeve 118 to which a bevel gear 119 is secured. The bevel gear 119 in turn meshes with a bevel gear 120 on the hub 121 of a number wheel 122, this number wheel being observed through a window 123.

When the vehicle is stationary, the wheel 101 occupies the position shown in Figure 3, but when the vehicle is in motion the rotation of the shaft 2 will cause the wheel 101 to assume a position more nearly at right angles to the axis of the shaft 2. This will cause the collars 105 and 107 to approach one another. The movement of the collar 107 will cause the movement of the plunger 112 in the hollow portion of the shaft, thus moving the arm 114. The slot 116 is so formed that the movement of the pin 115 along the slot will cause the revolution of the wheel 122 a distance proportional to the speed of revolution of the shaft 2. The form of the cam slot 116 is, of course, found by experiment.

Inasmuch as the claims herein are limited to the indicator or signal mechanism forming a part of the section B shown in the drawings, it will be unnecessary to give any further explanation than has already been given of the mechanism of section A shown in the drawings. Describing briefly the operation of the signal or indicator mechanism it will be seen that from power transmitted through the drive shaft, 2, the drum, 49, will be rotated step by step to bring its series of display openings, 63, in succession at the sight opening of the general casing, 1, and that through the rotation of the drum, 40, which carries the pawls, 51, and 52, the wheels of the odometers, 50, opposite the respective sight openings, 63, in the drum, 49, will be rotated step by step and at the expiration of the predetermined mileage the shutter or signal device associated with each odometer, 50, will be brought opposite the display opening, 63, and there be visible through the sight opening of the casing 1 provided for the section B, and thus notice given that the time has arrived for attention to such requirements of the car as are noted upon the periphery of the drum, 49. The requirements thus signaled as being necessary to be performed having been attended to, then by turning the resetting device, 81, the shutter or signal device is moved from display position and all is in readiness for a repetition of the display of the signal or shutter at the appointed time.

I claim:—

1. An indicating device for motor vehicles comprising an indicator identified with some matter in relation to the vehicle requiring attention, said indicator being a permanent element in the device and movable to and from the same position for display, and means to cause such indicator to move to such display position when a predetermined mileage is run.

2. An indicating device for motor vehicles comprising an indicator identified with some matter in relation to the vehicle requiring attention, said indicator being a permanent element in the device and movable to and from the same position for display, means to cause such indicator to move to such display position when a predetermined mileage is run, and means to move such indicator at will from its display position.

3. An indicating device for motor vehicles comprising an odometer, and a display opening therefor, a shutter movable to and from such opening, and means to move the shutter to one of its positions when a predetermined mileage is run.

4. An indicating device comprising an odometer and a display opening therefor, and an odometer controlled shutter for such opening.

5. An indicating device comprising an odometer and a display opening therefor, a shutter movable to and from such opening, and means actuated by the odometer to cause the movement of the shutter to the opening.

6. The combination with a traveling mechanism having parts requiring attention after a predetermined amount of travel, an indicator identified with some matter in relation to the mechanism requiring attention, and means repeatedly to cause such indicator to perform its indicating function upon a predetermined travel of the mechanism said indicator being permanently associated with such means.

7. An indicating device for motor cars comprising a mileage counter and indicia permanently associated therewith that call attention to some matter in relation to the car that requires periodic attention and repeatedly movable to and from the same display position.

8. An indicating device for motor cars comprising a mileage counter, and a signal permanently associated therewith identified with some matter in relation to the car requiring attention periodically and repeatedly movable to and from the same display position.

9. An indicating device for motor cars comprising a mileage counter, a casing having a display opening for the mileage, a movable signal identified with some matter in relation to the car requiring attention, and means to move said signal relative to such display opening deriving motion from the same source that the counter does.

10. A device of the character described comprising a casing provided with a sight opening, a numeral wheel readable through the sight opening, a signal movable to the sight opening in synchronism with the numeral wheel and deriving its movement from the movement of the numeral wheel, said signal indicating at the expiration of a predetermined period of operation of the device that the vehicle motor mechanism requires attention.

11. A device of the character described comprising a casing provided with a sight opening, a numeral wheel readable through the sight opening, a signal movable to the sight opening in synchronism with the numeral wheel and deriving its movement from the movement of the numeral wheel, said signal indicating at the expiration of a predetermined period of operation of the device that the vehicle motor mechanism requires attention, said signal being a part separate from the numeral wheel though moving therewith.

12. Means for giving notice of some matter in relation to a motor vehicle that requires attention at a predetermined mileage, comprising a signal device that is identifiable with such matter and means causing the production of the signal deriving motion from some moving member of the vehicle, said signal device having a permanent relation to said means whereby the same signal device may be repeatedly produced at the same point.

13. An indicating device for motor-cars comprising a movable indicator constructed independently of the odometer mileage wheels, means for moving said indicator to correspond to the mileage of the car, and said indicator being provided with a plurality of indicia showing the requirements of the car with regard to lubrication.

14. An indicating device for motor cars comprising an indicator mounted for movement in the same path to bring successive portions of its surface repeatedly to and from the same display position, and means for moving said indicator to correspond to the mileage of the car, said indicator being provided with a plurality of indicia showing the requirements of the car with regard to lubrication, and said indicator being constructed independenly of the odometer mileage wheels, and being a permanent element in the device.

15. The combination with a mechanism having parts to be lubricated, of a movable indicator, movable in a curved path to bring successive portions of its surface repeatedly to and from the same display position, and means for moving said indicator in correspondence with the travel of the mechanism, said indicator being provided with a plurality of indicia showing the requirements with regard to lubrication, and said indicator being constructed independently of revolution counting mechanism, said indicator being a permanent element in the combination.

16. An indicator for a device having various parts requiring attention as to lubrication, etc., in accordance with its extent of use, said indicator comprising a rotary member having a series of indicia thereon as to the nature of the attention required at different multiples of a predetermined unit of run, means for bringing said indicia in succession in register with a sight opening, a shutter movable to and from such opening which may be operated at will to move it in one direction with reference to the opening and means controlled by the subsequent rotation of said rotary member moving said shutter in the opposite direction.

17. An indicator for a device having various parts requiring attention as to lubrication, etc., in accordance with its extent of use, said indicator comprising a rotary member having a series of indicia thereon as to the nature of the attention required at different multiples of a predetermined unit of run, means for bringing said indicia in succession in register with a sight opening, a shutter movable to open and close such opening which may be operated at will to move it in one direction with reference to said opening, said shutter and said rotary member having mutual frictional engagement tending to oppose relative movement therebetween, and means for limiting the movement of said shutter with respect to said sight opening.

18. An indicating device for a motor vehicle for calling attention to periodically recurring requirements of the vehicle comprising a signal element of distinctive color, and automatic means that exhibits such element, when a predetermined mileage is run.

19. An indicating device for a motor vehicle for calling attention to periodically recurring requirements of the vehicle comprising odometer mechanism and a signal element of a distinctive color exhibited by said mechanism when a predetermined mileage is run.

20. The combination of a casing having a display opening, an odometer within the casing, and a signal element of a distinctive color brought by the odometer into view at such display opening.

21. A device of the character described comprising a casing provided with a sight opening, and numeral wheels readable through the sight opening, of an indicator element movable to and from said sight opening, movement of said element to said opening being produced by the rotation of said wheels, said element indicating at the expiration of predetermined periods of operation of the device that the vehicle motor mechanism requires attention.

22. An indicating device for motor-cars comprising a movable indicator constructed independently of the odometer mileage wheels, means connecting a moving part of the car with said indicator whereby the indicator is moved to correspond to the mileage of the car, and said indicator being provided with a plurality of indicia showing the requirements of the car with regard to lubrication.

23. An indicating device for motor-cars comprising a movable indicator constructed independently of the odometer mileage wheels, means for giving said indicator a step-by-step motion corresponding to the mileage of the car, and said indicator being provided with a plurality of indicia showing the requirements of the car with regard to lubrication.

24. The combination with a mechanism having parts to be lubricated, of a movable indicator and means for moving it in correspondence with the travel of the mechanism, said indicator being provided with a plurality of indicia showing the requirements with regard to lubrication, and said indicator being constructed independently of revolution counting mechanism.

25. The combination with a mechanism having a part to be lubricated, of an indicator and means for giving it an intermittent movement in accordance with the amount of travel of the mechanism, said indicator being provided with a plurality of indicia showing the requirements with regard to lubrication, and said indicator being constucted independently of revolution counting mechanism.

26. The combination with a power-driven vehicle having lubricating requirements for its moving parts in combination with an odometer, and an indicating means comprising an indicator which is constructed independently of the mileage wheels of the odometer, means for giving said indicator a step-by-step motion corresponding to the mileage of the car, and said indicator being provided with a plurality of indicia showing the requirements of the car with regard to lubrication.

27. The combination in a motor car of an odometer mounted in substantially stationary position, an indicator constructed independently of the mileage wheels of the odometer and movable with relation to the odometer, and provided with a plurality of indicia showing the lubricating requirements of the car, said indicator being adapted for movements corresponding to the mileage of the car to bring said various indicia into indicating position for showing the parts then requiring lubrication.

28. In an indicator, a casing, a drive shaft extending through said casing, a drum secured to the drive shaft within the interior of the casing, a second drum rotatable about the axis of the shaft concentrically of the first named drum, indicator means comprising a series of odometers carried by said second named drum, means carried by the first named drum for engaging the number wheels of the odometers to operate them, and means for intermittently and suddenly rotating the drum bearing the odometers to bring the odometers successively into reading position.

29. In an indicator, a casing, a drive shaft extending through said casing, a drum secured to the drive shaft within the interior of the casing, a second drum rotatable about the axis of the shaft concentrically of the first named drum, indicator means comprising a series of odometers carried by said second named drum, means carried by the first named drum for engaging the number wheels of the odometers to operate them, and means including an escapement mechanism for intermittently and suddenly rotating the drum bearing the odometers to bring the odometers successively into reading position.

30. In an indicator, a casing, a drive shaft extending through said casing, a drum secured to the drive shaft within the interior of the casing, a second drum rotatable about the axis of the shaft concentrically of the first named drum, a series of odometers carried by said second named drum, means carried by the first named drum for engaging the number wheels of the odometers to operate them, means for intermittently and suddenly rotating the drum bearing the odometers to bring the odometers successively into reading position, said last named means comprising a wheel mounted on said shaft, a spiral spring having one end connected with said wheel and the other end connected with the drum, and an escapement mechanism disposed between the wheel and the drum for permitting the revolution of the drum under the action of the spring after the wheel has revolved through a predetermined arc.

31. In an indicator mechanism, a shaft, a wheel mounted for revolution on said shaft and provided with a plurality of lugs, a drum mounted for revolution on the shaft, a spiral spring having one end connected with said wheel and the opposite end connected with the drum, said drum being provided with a plurality of lugs and openings, an escapement mechanism having portions arranged to engage the lugs on said wheel, and said drum, and having a portion arranged to enter the openings in the drum whereby the drum is revolved suddenly and intermittently after a predetermined amount of rotation of the wheel.

32. In a meter, a casing provided with a reading opening, a plurality of odometers carried within the casing, a common driving means for said odometers, and means operated by said common driving means for bringing the odometers successively into registration with the reading opening and for holding the odometers stationary when before the reading opening for a predetermined period.

33. In a meter, a casing having a reading opening, a plurality of shiftable odometers carried within the casing, and means for bringing the odometers successively before the reading opening and for stopping them in a position of rest while before the opening.

34. In a meter, a casing provided with a reading opening, a rotatable drum within the casing, a plurality of odometers carried by the drum and adapted to be brought into position before the reading opening, and means for intermittently rotating the drum from one odometer position to the adjacent one.

35. In a meter, a casing provided with a reading opening, a rotatable drum disposed within the casing, a plurality of odometers carried by the drum, a common driving means for all of said odometers, and means including an escapement mechanism for rotating the said drum intermittently to bring said odometers successively into position before the reading opening.

36. In a meter, a casing provided with a reading opening, a drum rotatably mounted within the casing and provided with a plurality of odometers, a spring for rotating the drum, an escapement for permitting the drum to rotate intermittently, and means for actuating the escapement and for bringing the spring under tension subsequent to each movement of the drum.

37. In a meter, a casing provided with a reading opening, a drum rotatably mounted within the casing and provided with a plurality of odometers, a spring for rotating the drum, an escapement for permitting the drum to rotate intermittently, means for actuating the escapement and for bringing the spring under tension subsequent to each movement of the drum, said last named means comprising a wheel connected to one end of said spring, the other end of the spring being connected to the shaft of the drum, and a lug carried by the wheel and arranged to engage the escapement during the rotation of the wheel.

38. In a meter mechanism, a shaft, a wheel mounted for revolution on said shaft and provided with a plurality of lugs, a drum mounted for revolution on said shaft, a spiral spring having one end connected with said wheel and the opposite end connected with the drum, said drum being provided with a plurality of lugs and openings, and escapement mechanism having portions arranged to engage the lugs on said wheel and said drum, and having a portion arranged to enter the openings in the drum whereby the drum is revolved suddenly after a predetermined angular displacement.

MARVIN SMITHEY.